May 10, 1966 J. S. HYDE 3,250,985
MICROWAVE CAVITY RESONATOR
Filed Oct. 23, 1962 2 Sheets-Sheet 1
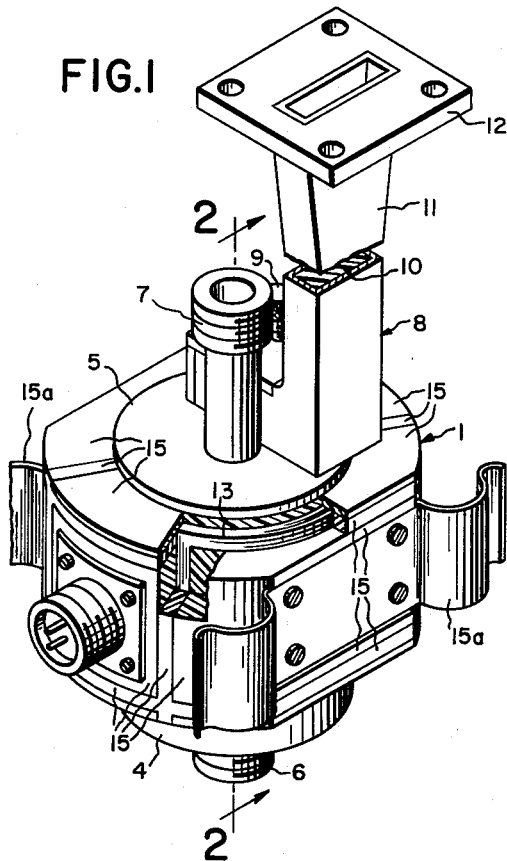
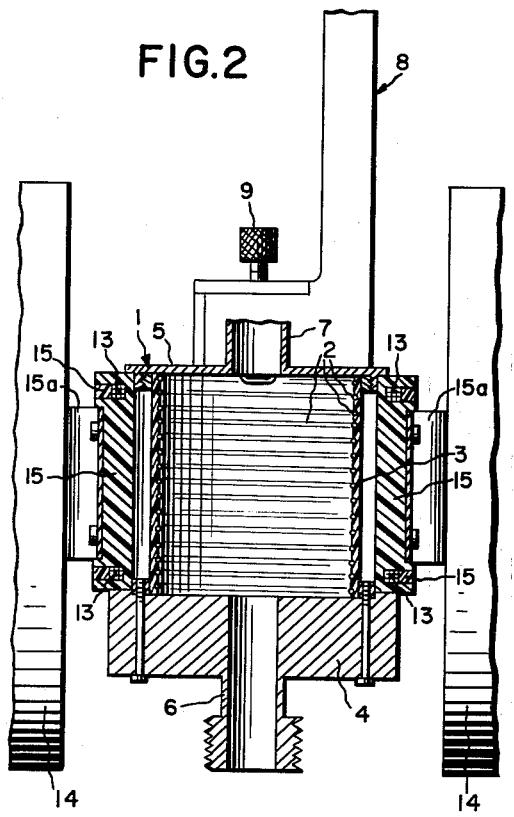
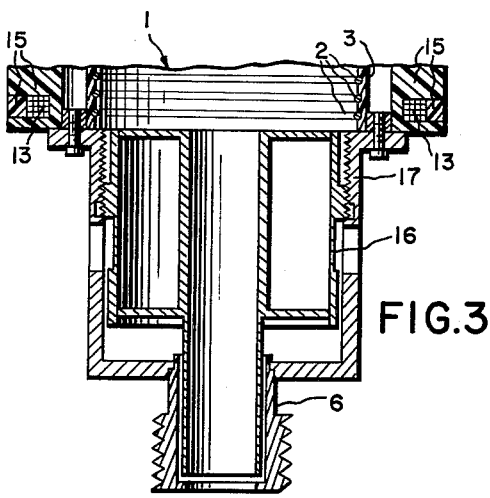
INVENTOR.
JAMES S. HYDE
BY
*J. Rosenblum*
ATTORNEY May 10, 1966   J. S. HYDE   3,250,985
MICROWAVE CAVITY RESONATOR
Filed Oct. 23, 1962   2 Sheets-Sheet 2
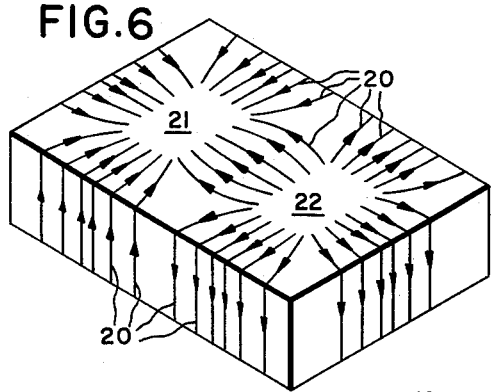
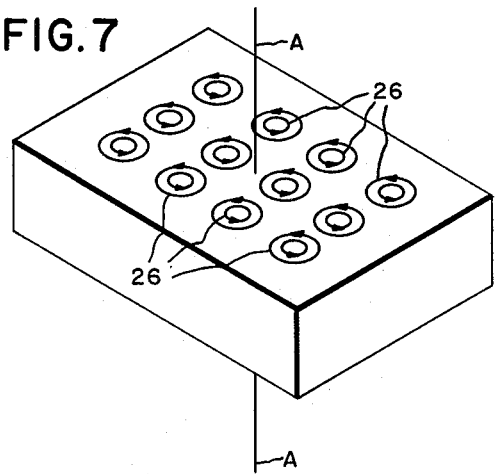
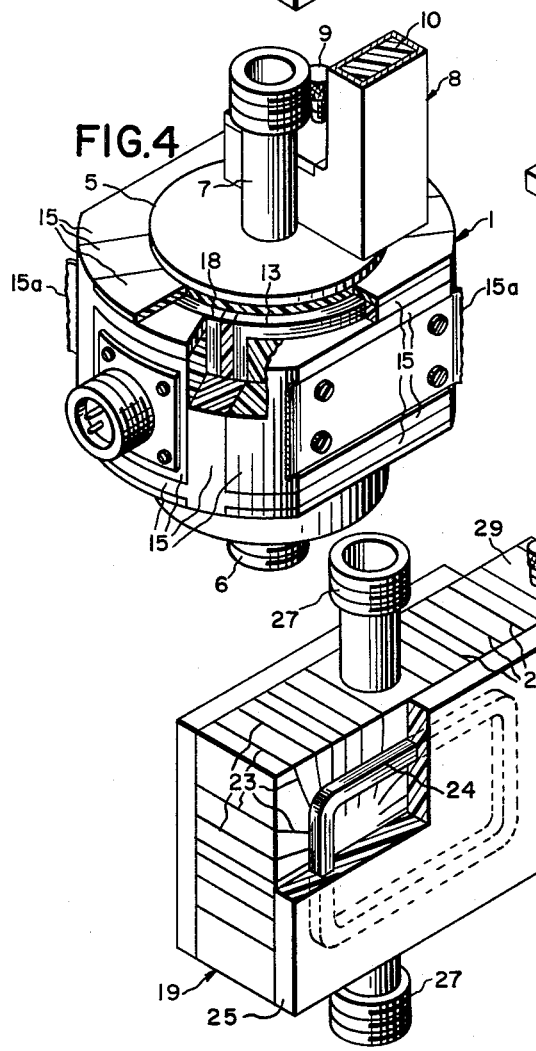
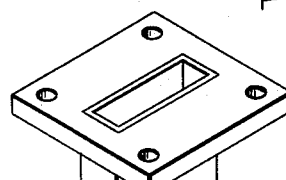
INVENTOR.
JAMES S. HYDE
BY
J. Rosenblum
ATTORNEY United States Patent Office 3,250,985
Patented May 10, 1966

3,250,985
MICROWAVE CAVITY RESONATOR
James S. Hyde, Menlo Park, Calif., assignor to Varian Associates, Palo Alto, Calif., a corporation of California
Filed Oct. 23, 1962, Ser. No. 232,508
13 Claims. (Cl. 324—.5)

The present invention relates in general to microwave cavity resonators, and more particularly to novel apparatus for creating superimposed alternating magnetic fields within cavity resonators, said superimposed fields alternating at frequencies lower than the resonant microwave frequency of the cavity resonator.

It is well known that the resonances of electrons and nuclei may be studied by placing a paramagnetic sample within a cavity resonator positioned between the pole pieces of a D.C. static-field-generating magnet. For a variety of reasons, it is customary to superimpose on this D.C. field an alternating magnetic field. While the discussion herein is specifically related to field modulation, that is, the addition of a small A.C. component to the static field in order to permit use of sensitive A.C. detection techniques, the discussion is generally applicable whenever an alternating magnetic field is superimposed upon a resonant sample as, for example, in measurements of the simultaneous resonances of electrons and nuclei in which R.F. magnetic fields are introduced at the sample at the precession frequencies of the nuclei in the sample, said alternating fields being superimposed on the cavity microwave magnetic field which is at the precession frequency of the electrons in the sample.

A difficulty with ordinary cavity resonators is that magnetic field modulation induces eddy currents which flow in closed current loops along the walls of the cavity. Associated with these eddy currents are three undesirable effects known specifically as:

(1) "Vibration"
(2) "Buck-out" of the modulation field, and
(3) Heating.

"Vibration" is an effect resulting from an interaction of the eddy currents with the static D.C. magnetic field. Vibration tends to distort the cavity dimensions and is ultimately productive of spurious resonance-like signals. "Buck-out" is an effect in which magnetic fields induced by the modulation field oppose the inducing modulation magnetic field. Heating is a well known effect, one kind of which results from resistive $I^2R$ losses occurring when the eddy currents flow in closed conducting paths. It is important in a cavity resonator to minimize these eddy-current-related effects consistent with the requirements of maintaining a high Q characteristic and achieving structural rigidity with ease of fabrication.

Eddy currents generated by magnetic field modulation, moreover, are proportional to the modulation frequency so that low modulation frequencies ordinarily must be used if these currents are to be minimized. But when a cavity resonator is used in a spectrometer for observing electron paramagnetic resonance (EPR), for example, it is desirable to employ high modulation frequencies, since the signal to noise ratio of such a spectrometer varies as the square root of the modulation frequency. Modulation frequencies of the order of 100 kc. or higher are desirable for EPR spectrometers.

Prior-art spectrometers have achieved high sensitivity by using high frequency field modulation at the expense of increasing one or more of the aforementioned eddy-current-related effects. The principal object of the present invention, therefore, is provision of a cavity resonator with high sensitivity upon which magnetic fields alternating at either low or very high frequencies may be superimposed while eddy currents are simultaneously minimized and eddy-current-related effects are eliminated.

One feature for accomplishing this object is provision of a cavity resonator, the side walls of which are circumscribed by an ensemble of very thin narrowly-spaced metallic conducting elements, so as to be substantially open to external field modulation. In the preferred cylindrical embodiment, these conducting elements form one or more continuous helical filaments dissecting closed conducting paths of eddy currents. In the preferred rectangular embodiment, these conducting elements form a printed circuit combination of discontinuous electrically-insulated filaments disposed in spaced-apart relationship along lines of cavity current flow and are interruptive of closed conducting paths of eddy currents.

According to the preferred forms of the present invention, very thin metallic conducting filaments are used to support a microwave field. Small filaments with minimal surface area present maximum impedance to the flow of field-modulation-induced eddy currents which tend to flow along the surface of the filaments and through the filaments to the extent of a surface thickness equal to the skin depth, which typically is 8 mils at 100 kc. for copper. The spacing of these conducting filaments is arranged to be of the order of the cross-sectional dimension of the filaments or less. These steps assure that microwave losses from the cavity are minimized, that modulation fields penetrate the side walls of the cavity without appreciable alteration at high as well as low frequencies, and that a high Q characteristic of the cavity resonator is preserved.

It is necessary, moreover, that the wall structure for supporting a microwave field and eliminating eddy-current-related effects possess a maximum of structural rigidity consistent with the need for minimal-surface-area filaments. It is also advantageous that the conducting filaments forming the surrounding wall structure of the cavity resonator not form closed electrical paths in a preferred embodiment since, if any lines of magnetic flux arising from the superimposed alternating magnetic field pass through closed electrical paths, eddy currents will flow along the surface of the closed conducting filaments and through a surface thickness of such filaments equal to the skin depth of the metallic filament at the frequency of the superimposed alternating magnetic field.

One feature of a preferred cylindrical embodiment of the present invention, therefore, is provision of a thin metallic conducting wire wound helically on a mandrel which may be removable or may comprise a thin walled cylinder of quartz, for example, which configuration effectively precludes distortion of the cavity cross-sectional dimensions due to "vibration" effects and eliminates "buck-out" of the modulation field.

In certain microwave resonance experimentation, it is advantageous to make measurements of resonance effects for different static field directions in the sample. It is necessary, moreover, that the modulation field direction remain parallel to the static D.C. field direction in order to obtain a strong signal from the sample.

Another feature of the present invention, therefore, is the provision of a cylindrical cavity resonator including modulation means which are free to rotate together with the pole pieces of an external static-field-generating magnet whereby the modulation field is always parallel to the D.C. field of the magnet permitting verical axis rotation studies on microwave resonant samples without sacrifice of sensitivity.

In certain other microwave resonance experiments, it is advantageous to make measurements of resonance effects in a sample which is exposed to external irradiation such as light.

Another feature of the present invention, therefore, is the provision of a cavity resonator which is substantially open to external irradiation.

These and other features and advantages of the present invention will be more apparent after a perusal of the following specification taken in connection with the accompanying drawings wherein the same numeral is used in the various figures for the same or analogous element, and:

FIG. 1 is an isometric view, partially broken away, of a cylindrical cavity assembly suitable for operation in $TE_{011}$ microwave mode in accordance with the present invention.

FIG. 2 is a cross-sectional view taken along line 2—2 of FIG. 1.

FIG. 3 is a fragmentary cross-sectional view of the combination of a detachable end-plate and tuning plunger which may be used in a modification of the embodiment of FIG. 1.

FIG. 4 is an isometric view, partially broken away, of a $TE_{011}$ cylindrical cavity assembly for producing two alternating magnetic fields superimposed on the cavity magnetic field in accordance with the present invention.

FIG. 5 is an isometric view, partially broken away, of a $TE_{102}$ rectangular cavity assembly in accordance with the present invention.

FIG. 6 is a schematic isometric view of a $TE_{102}$ rectangular cavity illustrating the flow of cavity microwave currents.

FIG. 7 is a schematic isometric view of a $TE_{102}$ rectangular cavity showing eddy currents produced by a modulation field, the axis of which is along the line A—A.

Referring now to FIGS. 1 and 2, a cylindrical cavity resonator 1 is shown. In an exemplary embodiment, resonator 1 has a diameter of 1.65 inches and an effective length of 1.65 inches, for example, which dimensions are suitable for operation of the resonator in the $TE_{011}$ microwave mode at a resonance frequency of approximately ten kilomegacycles. Filaments 2, circumferentially wound to form the side wall of resonator 1, are supported by dielectric support form 3, which is supported between circular end plates 4 and 5. In the preferred embodiment, filaments 2 comprise a continuous helical wire wound on a removable mandrel and cemented with a dielectric epoxy. Alternatively, the wire may be wound on a thin-walled quartz tube, for example. In the preferred embodiment, wire 2 has a small 10 mil diameter, for example, and the turns are spaced apart a distance of the order of the diameter of the wire or less, for example, a distance of 5 mils. An unloaded high Q characteristic of the order of 22,000 for cavity resonator 1 is achieved thereby, while eddy-current-related effects are eliminated, including "buck-out" of the modulation field generated by sweep-coils 13 and "vibration" distortion of wire 2.

Conducting end-closing walls 4 and 5 have centrally-disposed metal stacks 6 and 7 respectively, which are waveguides beyond cut-off, for permitting sample-tube access to the cavity without leakage of microwave power. In one embodiment, end wall 4 is detachable and may be replaced by an end wall having a tuning plunger.

Coupling to a rectangular waveguide transmission line is achieved by means of waveguide coupling assembly 8, comprising variable coupler 9, dielectric-filled rectangular waveguide 10, taper 11, and flange 12. Variable coupler 9 is disposed for inductive coupling to cavity 1 in the end-closing wall 5 in an off-center region of maximum magnetic field within cavity 1. A novel variable coupler suitable for this purpose is the subject of the copending patent application of John C. Everitt, Serial No. 228,113, filed October 3, 1962, and now Patent No. 3,214,684 and assigned to applicant's assignee. This particular coupler permits variable inductive coupling to the cavity while maintaining constant capacitive coupling to the waveguide. Use of this coupler is especially advantageous here because it permits access centrally through stack 7 for disposing a sample centrally within cavity resonator 1 and does not interfere with rotation of modulation sweep-coils 13.

Modulation coils 13, when energized by an external power supply, serve to modulate the static D.C. magnetic field generated between the pole pieces 14 of a high-field magnet. Coils 13 are enclosed by segmented dielectric supports 15. The coils and supports are free to rotate between end plates 4 and 5 due to a bearing engagement therewith. A pair of positioning-spring brackets 15a are mounted on support 15. The brackets serve to clamp the axis of the modulation coils in coaxial alignment with the axis of the pole pieces 14 of the electromagnet. Thus when the pole pieces are rotated through a given angle, the modulating field always remains parallel to the static D.C. magnetic field so that it is possible to make resonance measurements for different D.C. magnetic field directions in a resonant sample without sacrifice of sensitivity.

The cylindrical cavity 1 may be tuned over a frequency range by removing detachable end plate 4 and replacing it with the end-plate-tuner assembly shown in FIG. 3. Referring now to FIG. 3, tuning plunger 16 is threaded to end plate housing 17. Since the end plate housing is cut away to expose the plunger, normal frequency adjustment is accomplished simply by turning the plunger so as to advance or withdraw the plunger from the cavity. This modification is advantageous in connection with applications in which it is desired to introduce Dewars and samples into the cavity without altering the resonance frequency of the resonator.

It will be noted that the open wall construction of the present invention also allows the introduction of external irradiation such as light, if desired. In this case the filament and modulation coil supporting structures must be designed to avoid blockage of the radiation. For example, these structures may be made of a material which is transparent to light in the desired range of light frequencies such as quartz, for example.

Referring now to FIG. 4, the cavity resonator shown in FIG. 1 may conveniently be modified to permit simultaneous measurements on the electron and nuclear resonances of a resonant sample by the addition of a second pair of coils 18 for producing an R.F. magnetic field at the nuclear magnetic resonance frequency of the sample. The axis of these coils is perpendicular to that of sweep coils 13 so as to provide an alternating magnetic field which is substantially perpendicular to the static D.C. field. Eddy-current-related effects which tend to result from the superposition of this A.C. magnetic field are eliminated by virtue of the unique spaced-apart structure of thin filaments 2. The resulting structure is otherwise identical in all other respects to that of FIG. 1.

Another embodiment of the present invention represented by the rectangular cavity resonator 19 shown in FIG. 5 is suitable for operation in the $TE_{102}$ microwave mode, for example. Referring now to FIG. 6, microwave currents for this mode flow around the walls as indicated by current lines 20. Regions 21 and 22 of converging and diverging current lines respectively are regions of null current amplitude.

Referring now to FIG. 5, thin metallic conducting strips may be placed along the current lines by printed-circuit techniques, for example, so as to form a grid of discontinuous wire-like conducting strands 23. In this embodiment, the conducting strands are not joined in regions 21 and 22 of FIG. 6. Coils 24 for producing modulation of a static D.C. magnetic field generated by an electromagnet which is not shown are disposed within dielectric material 25. Magnetic field modulation normally creates eddy currents 26 flowing in solid cavity walls as shown in FIG. 7 for the rectangular $TE_{102}$ cavity configuration exhibited in FIG. 5. Conducting strands 23, therefore, are not connected in regions 21 and 22 of FIG. 6 in order to exclude closed-conducting-current-loop paths of eddy currents 26, whereby eddy-current-related effects are eliminated. It will also be noted that the open filamentary wall structure exhibited in FIGS. 1 and 2 interrupts closed-conducting-current-loop paths of eddy currents which would exist in a solid cylindrical wall.

The rectangular cavity resonator 19 may include stacks 27 of metal or quartz, for example, permitting a resonant sample to be disposed centrally within the cavity. Electromagnetic energy is coupled into the cavity from rectangular waveguide 28 through coupling plate section 29.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Microwave apparatus comprising: a cavity resonator having a surrounding conducting wall structure, said wall structure comprising a system of conducting members formed by a continuous helical filament, said helical members being spaced from each other and extending in the direction of flow for microwave currents in the desired resonant mode of said cavity resonator; means for applying a static D.C. field to said cavity resonator; and means for applying a superimposed alternating magnetic field interior of said cavity resonator, said alternating field threading said wall structure, the spaced-apart configuration of said conductors being interruptive of closed-conducting paths of eddy currents which tend to be established in said wall structure by said superimposed field.

2. A resonant-cavity assembly comprising:
  (1) spaced-apart enclosing conducting means forming side wall structure of a resonant cavity, said conducting means being formed from a continuous metallic helical filament, the helical portions of said filament being spaced from each other,
  (2) conducting end-closing walls closing the ends of said side wall structure, means for applying a static D.C. magnetic field to said cavity; and
  (3) means adapted for energization by external power supply means for establishing an alternating magnetic field superimposed upon a microwave resonance magnetic field within said cavity.

3. A microwave apparatus for superimposing alternating magnetic fields upon a sample disposed in a microwave resonant cavity comprising, in combination:
  (a) a cavity assembly comprising:
    (1) spaced-apart electrically conducting circumferential filaments interruptive of closed conducting paths of eddy currents and disposed about
    (2) dielectric means supporting said conducting filaments, said diamagnetic means and said conducting filaments comprising side wall structure of a microwave resonant cavity,
    (3) conducting end-closing walls closing the ends ends of said side-wall structure, an electromagnet for supplying a D.C. magnetic field to said cavity,
    (4) coil means external said cavity adapted for energization by external power supply means for producing at least one alternating magnetic field superimposed on the microwave field of said cavity,
  (b) a waveguide coupling assembly comprising:
    (1) waveguide means adapted for joining said cavity to a waveguide transmission line external said cavity, and
    (2) coupling means disposed adjacent said end-closing walls for coupling microwave energy between said waveguide transmission line and said cavity.

4. A microwave apparatus according to claim 3 wherein said coil means produce modulation of the static D.C. magnetic field of said electromagnet external said cavity and further including means for fixed positioning of said coil means between the pole faces of said electromagnet whereby said modulation field is always parallel to the static D.C. field of said magnet.

5. A microwave apparatus according to claim 4 wherein said waveguide means comprise a rectangular waveguide filled with dielectric material and rectangular-taper means for joining to a rectangular waveguide transmission line external said cavity.

6. A microwave apparatus comprising, in combination,
  (a) a continuous thin wire of circumferential metallic filaments forming a conductive system interruptive of closed conducting paths of eddy currents,
  (b) dielectric material for supporting said circumferential conducting filaments to form the side wall of a cylindrical cavity resonator, adjacent portions of said circumferential filaments being spaced from each other,
  (c) at least one conducting end-closing wall closing the ends of said side wall, magnet means for applying a high intensity D.C. magnetic field to said resonator,
  (d) rotatable sweep-coil means mounted on the cavity resonator and adapted for energization by external power supply means for producing modulation,
  (e) waveguide means adapted for joining said cavity to external rectangular waveguide means, and
  (f) coupling means disposed off-center in said end-closing wall.

7. An apparatus according to claim 6, wherein said dielectric material is a thin-walled quartz cylinder.

8. A microwave apparatus for enabling super position of alternating magnetic fields upon a paramagnetic sample disposed in a microwave resonant cavity comprising, in combination:
  (a) a microwave cavity assembly comprising:
    (1) spaced-apart conducting means forming a conductive system interruptive of closed conducting paths of eddy currents and disposed about dielectric means, said conducting means and said dielectric means comprising side wall structure of a microwave resonant cavity,
    (2) conducting end-closing walls closing the ends of said side wall structure,
    (3) first sweep-coil means mounted on said cavity and adapted for energization by external power supply means for producing a first alternating magnetic field directed along a first axis coaxial with the axis of pole pieces of external magnet means, and
    (4) second coil means mounted on said cavity and adapted for energization by external power supply means for producing a radio frequency magnetic field, said second coil means having a second axis perpendicular to said first axis of said first alternating magnetic field.

9. An apparatus according to claim 8 wherein said conducting means is a continuous helical metallic filament.

10. An apparatus according to claim 9 wherein said cavity resonator is cylindrical and said sweep-coil means are rotatable about said resonator.

11. A microwave apparatus comprising, in combination,
  (a) spaced-apart conducting means forming a conductive system for interrupting closed conducting paths of eddy currents,
  (b) dielectric material for supporting said conducting means to form rectangular side walls of a rectangular cavity resonator,
  (c) at least one conducting end-closing wall, closing the ends of said side walls, magnet means for applying a high intensity D.C. magnetic field to said cavity resonator,
  (d) sweep-coil means mounted on the cavity resonator and adapted for energization by external power supply means for producing modulation, (e) waveguide means adapted for joining said cavity to external rectangular waveguide transmission means, and (f) coupling means disposed in one of said end-closing walls, wherein said resonator is resonant in the $TE_{102}$ microwave mode and said spaced-apart conducting means are discontinuous metallic conducting filaments disposed along lines of current flow in the side walls of said resonator.

12. A gyromagnetic apparatus including a cavity resonator for containing a resonant sample and for subjecting such sample to the simultaneous influence of a microwave field and a modulating alternating magnetic field comprising:

means including a continuous helical conducting filament forming a wall structure of said cavity resonator, adjacent helices of such filament being spaced apart; means for applying a D.C. magnetic field to the cavity resonator; and means for superimposing a modulating alternating magnetic field onto said D.C. field, said D.C. and alternating fields being parallel.

13. A gyromagnetic apparatus as in claim 12 wherein said cavity is resonant in the $TE_{0MN}$ microwave mode, where M and N are integers.

References Cited by the Examiner
UNITED STATES PATENTS

| | | | |
|---|---|---|---|
| 2,707,235 | 4/1955 | Townes. | |
| 2,784,378 | 3/1957 | Yager | 333—83 X |
| 2,841,791 | 7/1958 | Schlicke | 333—83 |
| 2,851,652 | 9/1958 | Dicke | 330—4 |
| 2,863,998 | 12/1958 | Marie | 330—4 |
| 2,965,795 | 12/1960 | Norton. | |
| 3,020,501 | 2/1962 | Cole et al. | 333—98 |
| 3,106,768 | 10/1963 | Gent et al. | 333—95 |

FOREIGN PATENTS 70,100    10/1958    France.

OTHER REFERENCES

Pipkin et al., Physical Review, vol. 109, No. 5, March 1, 1958, pages 1423 to 1439 incl.

Feher, Physical Review, vol. 114, No. 5, June 1, 1959, pages 1219–1244 incl. (page 1224 principally relied on).

CHESTER L. JUSTUS, *Primary Examiner.*

MAYNARD R. WILBUR, *Examiner.*